(12) United States Patent
Khoo

(10) Patent No.: US 7,722,905 B2
(45) Date of Patent: *May 25, 2010

(54) METHOD TO REDUCE ODOR OF EXCRETA FROM COMPANION ANIMALS

(75) Inventor: Christina Khoo, Lawrence, KS (US)

(73) Assignee: Hill's Pet Nutrition, Inc., Topeka, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/996,715

(22) Filed: Nov. 24, 2004

(65) Prior Publication Data

US 2005/0112217 A1 May 26, 2005

Related U.S. Application Data

(60) Provisional application No. 60/525,306, filed on Nov. 26, 2003.

(51) Int. Cl.
*A61K 36/906* (2006.01)
(52) U.S. Cl. .................................................. 424/756
(58) Field of Classification Search .................. None
See application file for complete search history.

(56) References Cited

U.S. PATENT DOCUMENTS

| | | | |
|---|---|---|---|
| 4,166,867 A | | 9/1979 | Betz et al. |
| 4,996,055 A | * | 2/1991 | Kurasawa .................... 424/442 |
| 5,339,771 A | | 8/1994 | Axelrod |
| 5,401,502 A | | 3/1995 | Wunderlich et al. |
| 5,419,283 A | | 5/1995 | Leo |
| 5,567,424 A | | 10/1996 | Hastings |
| 5,869,085 A | | 2/1999 | Smith |
| 5,900,251 A | | 5/1999 | Raissen |
| 5,951,946 A | | 9/1999 | Eaton et al. |
| 6,156,355 A | | 12/2000 | Shields, Jr. et al. |
| 6,264,928 B1 | | 7/2001 | Jean et al. |
| 6,309,676 B1 | * | 10/2001 | Lewandowski .............. 424/754 |
| 6,426,089 B1 | | 7/2002 | Sunohara et al. |
| 6,528,084 B2 | | 3/2003 | Yu et al. |
| 2002/0114841 A1 | | 8/2002 | Yu et al. |

FOREIGN PATENT DOCUMENTS

| | | |
|---|---|---|
| DE | 10046861 A1 | 3/2002 |
| EP | 0 674 842 A1 | 4/1995 |
| EP | 0979612 A | 2/2000 |
| GB | 2359746 A | 9/2001 |
| JP | 06189717 | 7/1994 |
| JP | 10234312 | * 9/1998 |
| JP | 2001-372821 | * 4/2001 |
| JP | 2001-354580 | * 12/2001 |
| JP | 2004-236594 | 8/2004 |
| WO | 0145517 A | 6/2001 |
| WO | WO 01/82718 A1 | 11/2001 |

OTHER PUBLICATIONS

Giffard et al. (Journal of the American Veterinary Medical Association, (Mar. 15, 2001) vol. 218, No. 6, pp. 892-896).*
JP 2003 246743 A, (Abstract) Derwent Publications Ltd., London, GB, Database WPI, AN 2003-837290, Week 200378.
KR 2003 028 441 A, (Abstract) Derwent Publications Ltd., London, GB, Database WPI, AN 2003-538633, Week 200351.
CN 1 089 441A, (Abstract) Derwent Publications Ltd., London, GB, Database WPI, AN 1995-255441, Week 199534.
JP 63 000266 A, Patent Abstracts of Japan, vol. 012 No. 198 (Jun. 8, 1988).
JP 09 037721 A, Patent Abstracts of Japan, vol. 1999, No. 06 (Mar. 31, 1999).
JP 2003 250464 A, (Abstract) Derwent Publications Ltd., London, GB, Database WPI, AN 2003-821128, Week 200465.
JP 06 227999 A, (Abstract) Derwent Publications Ltd., London GB, Database WPI, AN 1994-299700, Week 199437.
JP 56 092745 A, Patent Abstracts of Japan, vol. 005, No. 164 (Oct. 21, 1981).
Association of American Feed Control Officials, Inc. (2003) *Official Publication*, pp. 126-140.
DerMarderosian, A. (2001) *The Review of Natural Products: Facts & Comparisons*. St Louis, MO. pp. 243-246.
NRC (1989) *Nutrient Requirements of Horses*, 5th Revised Edition, pp. 39-48.
NRC (1994) *Nutrient Requirements of Poultry*, 9th Revised Edition, pp. 19-34.
NRC (1998) *Nutrient Requirements of Swine*, 10th Revised Edition, pp. 110-123.
Platel, K. et al. (2001) *Nutrition Research* 21(9), 1309-1314.
Savitri, A. et al. (1986) *Food Microbiology* 3(2), 195-199.
The Super Food Products p. 1. Kibble Boost'r.™. http://www.efarms.cc/Products%20Page.htm#Kibble%20Boost, Mar. 22, 2005.
NPIC: Products: GTH SensiBelly™. http://www.n-bone.com/oroducts/gth-sensibelly.html, 2003.
Canine Health Nutrition—Mini Babydog 30 Small Breed Dog Formula. http://www.caninehealthnutrition.com/minibabydog.htm, 2000.
Canine Breath Freshener—Product Page. http://www.justmagick.com/product.html, Mar. 22, 2005.
Database WPI Week 199437 Thomson Scientific, London, GB; AN 1994-299700 XP002324429.
European Search Report Dated Oct. 7, 2008.

* cited by examiner

*Primary Examiner*—Christopher R. Tate
(74) *Attorney, Agent, or Firm*—Shannon McGarrah

(57) ABSTRACT

A method is provided for reducing odor of excreta of a companion animal. The method comprises causing the animal to ingest a composition comprising an excreta odor reducing effective amount of a zingiberaceous spice such as ginger or an extract thereof, or an excreta odor reducing effective amount of fiber together with another odor reducing agent.

8 Claims, No Drawings

METHOD TO REDUCE ODOR OF EXCRETA FROM COMPANION ANIMALS

This application claims priority of U.S. provisional patent application Ser. No. 60/525,306, filed Nov. 26, 2003, which is incorporated herein by reference in its entirety.

FIELD OF THE INVENTION

The present invention relates to a method of reducing odor of excreta from a companion animal.

BACKGROUND OF THE INVENTION

Excreta odor in companion animals is an unpleasant reality of living with pets. For owners of animals that live indoors, especially cats and dogs that use litter boxes or are confined to kennels or other small spaces, this problem is particularly unpleasant. Cat litter containing deodorizers has been developed, however this is an imperfect solution to the problem. Excreta odor in animals is partially a result of indigestion and microbial fermentation caused by inappropriate bacterial activity, inflammation and poor digestion or motility.

Ginger and its constituents have been credited with numerous properties including anti-emetic, antioxidant, anti-inflammatory, and antimicrobial activities. DerMarderosian (2001) *The Review of Natural Products*. St Louis Mo.: Facts & Comparisons.

Japanese Patent No. 4,359,113 discloses use of ginger to prevent development of fishy odor related to seafood.

Effects of spices, including ginger, on reducing in vitro formation of intestinal gas are described in Savitri et al. (1986) *Food Microbiology* 3(2), 195-199.

Platel et al. (2001) *Nutrition Research* 21(9), 1309-1314, describe the influence of several spices, including ginger, in reducing bowel transit time.

U.S. Pat. No. 5,567,424 discloses a health food containing soy lecithin, ginger, bran, apple fiber and many other materials. This patent is directed to a composition which is said to be nutritious and healthy, to promote regular bowel movement and not to produce the large painful stools produced by bulking agents such as psyllium. A composition as described therein contains more than ten ingredients, including candied ginger.

U.S. Pat. No. 5,951,946 describes a composition for reducing odors by applying a plant extract from the order Zingiberales, more particularly a banana extract, to an odorous substrate. Examples of such odorous substrates mentioned include manure, urine, sewage sludge, hay, straw, grass, soil, compost, carpet, animal feeds, diapers, garbage, food wastes, ponds, fountains, and septic tanks.

SUMMARY OF THE INVENTION

This invention is directed to methods for reducing odor of excreta discharged by animals. It is contemplated that such methods can be suitable for use in humans and non-human animals, more particularly companion animals such as cats and dogs.

The invention is directed, in part, to a method for reducing odor of excreta of a companion animal, the method comprising causing the animal to ingest, for example by feeding to the animal, a composition comprising an excreta odor reducing effective amount of a zingiberaceous spice or an extract thereof. The composition can be, for example, a food, supplement, treat, snack or toy. Throughout this specification where ginger or an extract thereof is indicated, it will be clear to one skilled in the art that any other zingiberaceous spice or an extract thereof can be substituted.

The composition optionally further comprises one or more odor reducing agents other than ginger or an extract thereof, for example those disclosed hereinbelow. The combination of ginger or an extract thereof and one or more additional odor reducing agents in a composition fed to a companion animal can, according to certain embodiments of the invention, have a superior effect in reducing excreta odor.

Advantages and benefits of the present invention will be apparent to one skilled in the art from reading this specification.

DETAILED DESCRIPTION

The term "excreta" is used generically herein to refer to all forms of biological waste generated by an animal, including urine, feces (i.e., stools), and intestinal gas (flatulence). According to one embodiment, the method of the invention is used to reduce stool odor. According to another embodiment, the method is used to reduce odor of gas passed by the animal.

The term "zingiberaceous spice" herein refers to plant parts or an extract thereof from a plant of the botanical family Zingiberaceae, including but not limited to galanga, cardamom, turmeric, myoga and ginger.

For purposes of this application, "ginger" includes plant parts, particularly rhizomes (sometimes referred to as "roots"), of *Zingiber officinale* and other *Zingiber* species. This includes ginger in any form such as powder, dehydrated, fresh, cooked or raw. An "extract" of ginger herein is any preparation containing substances extracted from ginger, including fluid extracts, tinctures, essential oils, distillates and oleoresins.

It has been found in accordance with this invention that ginger and extracts thereof can be surprisingly effective in reducing odor of excreta from an animal when included in the animal's diet. Without being held to a particular theory, it is believed that the beneficial effects of the present invention result at least in part from antimicrobial, anti-inflammatory and gastric stimulation properties of ginger. Specifically, it is believed that ginger reduces the level of odor producing compounds including heterocycles, phenols, thiols, sulfides and indoles present in excreta, and in this way reduces excreta odor including fecal, urinary and flatulence odor.

It has further been discovered in accordance with the present invention that additional odor reducing agent(s), when used in combination with ginger or an extract thereof, can be useful in reducing excreta odor in companion animals such as cats and dogs. In various embodiments, such additional odor reducing agent(s) are selected from the group consisting of fibers, minerals, zinc salts, for example zinc acetate, herbs and spices, extracts of herbs and spices, probiotics, enzymes and proteins.

Illustratively, among herbs and spices that can be used together with ginger or an extract thereof are rosemary, garlic, caraway, dove wheat, chickweed, banana, marjoram, chamomile, nutmeg, allspice, cumin, tarragon, thyme, licorice, basil, celery seed, lemon balm, lavender, fennel, anise, nettle, echinacea and yucca, for example Mohave yucca (*Yucca schidigera*). Extracts of herbs and spices that can be used together with ginger or an extract thereof illustratively include essential oils, for example selected from the group consisting of oils of lemon, peppermint, thyme, vanilla, citrus, cinnamon, eucalyptus, lavender, clove and oregano. Additional plant extracts that can be used according to the invention are listed in U.S. Pat. No. 5,401,502, which is incorporated herein by reference in its entirety.

Without being held to a particular theory, it is believed that odor binding compounds, compounds that mask odors, compounds that reduce odor through microbial modulation, anti-inflammatory means or enzymatic modulation, and compounds that reduce odor through modification of nitrogen metabolism or binding of ammonia, when used in combination with ginger or extracts thereof, can in some cases have a synergistic effect on reducing excreta odor.

It is contemplated that the methods of this invention can be useful for a variety of animals, including humans and non-human animals such as non-human primates (e.g., monkeys, chimpanzees, etc.), companion animals (e.g., dogs, cats, horses, etc.), farm animals (e.g., goats, sheep, swine, cattle, etc.), laboratory animals (e.g., mice, rats, etc.), birds (e.g., domestic birds such as canaries, parrots, etc. and commercial birds such as chickens, ducks, turkeys, etc.), rodents (e.g., hamsters, guinea pigs, gerbils, rabbits, hedgehogs, ferrets, chinchillas, etc.) and wild, exotic and zoo animals (e.g., wolves, bears, deer, etc.).

In some embodiments of this invention, the animal is a cat.

In other embodiments of this invention, the animal is a dog.

This invention contemplates a variety of compositions containing ginger or an extract thereof, alone or in combination with other odor reducing agents including those listed above. Contemplated compositions include, for example, foods, supplements, treats, snacks, toys (typically chewable and consumable toys), beverages and high-moisture gels. Alternatively, a composition comprising ginger or an extract thereof can be administered in oral unit dosage form such as a pill, tablet, gel or capsule.

In general, the invention will be found useful for food compositions that comprise, on a dry matter basis, 0 to about 50% by weight of carbohydrate; about 5% to about 70% by weight of protein; about 2% to about 50% by weight fat; and 0 to about 15% by weight of nutritional balancing agents.

Ginger should be present in the composition in an amount effective to reduce excreta odor when the composition is used according to the present method. For example, the amount of ginger in a composition of this invention can be at least about 0.01%, illustratively about 0.05% to about 12%, or about 0.1% to about 5%, of the total weight of the composition.

When an extract of ginger is used, the amount used should be equivalent to ginger, for example powdered ginger, in an amount of at least about 0.01%, illustratively about 0.05% to about 12%, or about 0.1% to about 5%, of the total weight of the composition. The precise amount of an extract to be used depends, among other factors, on the degree to which the extract has been concentrated during preparation, but is typically about 5 ppm to about 2000 ppm by weight of the composition. One of skill in the art will, by routine testing based on the disclosure herein, readily establish an amount of a particular extract of ginger equivalent in effectiveness to the amounts of ginger, for example powdered ginger, given above.

A "ginger equivalent amount" herein means an amount of ginger or an extract thereof that is equivalent in its odor reducing effect to a stated amount of ginger, for example powdered ginger.

In one embodiment of the invention, the composition comprises ginger or an extract thereof in combination with fiber. Fibers are important food constituents that help modulate gut motility through various mechanisms such as water holding capacity, physical bulking, fuel for the gut bacteria, change in viscosity, etc. Examples of fibers include, but are not limited to, cellulose, hemicellulose, citrus pulp, barley, bran, bananas, oat fiber, mannan-oligosaccharide, pectin, xylooligosaccharide, burdock, beet pulp, inulin, arabinogalactan, oligosaccharides from gums, galactose, other xylans, fructans, dextrans, resistant starches, etc. According to the present embodiment, fiber should be present at levels of about 0.1% to about 20%, for example about 1% to about 11%, of the total weight of the composition.

In a related embodiment, a method for reducing odor of excreta of a companion animal is provided, the method comprising causing the animal to ingest a composition comprising an excreta odor reducing effective amount of a composition comprising fiber, for example in an amount as stated above, together with another odor reducing agent. According to this embodiment, the odor reducing agent can be selected from the group consisting of minerals, zinc salts, for example zinc acetate, herbs and spices, extracts of herbs and spices, probiotics, enzymes and proteins.

In various embodiments, the composition of the fiber can be 100% non-fermentable fiber, 100% moderately fermentable fiber or 100% highly fermentable fiber.

In other embodiments, the composition of the fiber can include at least about 0.1% by weight, for example at least about 10%, at least about 20%, or at least about 60%, of the total fiber composition in the form of non-fermentable fiber. In certain embodiments, the fiber comprises about 10% to about 80%, for example about 40% to about 60%, by weight of the total fiber composition in the form of fermentable fiber, with the balance being non-fermentable fiber.

In certain embodiments, the composition of the fiber includes about 5% to about 50%, for example about 10% to about 15%, by weight of the total fiber composition of moderately fermentable fiber.

In certain embodiments, the composition of the fiber includes 0% to about 20%, for example about 10% to about 15%, by weight of the total fiber composition in the form of highly fermentable fiber.

Non-fermentable fibers include but are not limited to cellulose, oat fiber, hemicellulose and peanut hulls.

Moderately fermentable fibers include but are not limited to beet pulp, citrus pulp, resistant starches, some gums, galactooligosaccharides, mannan-oligosaccharide, burdock, rice bran, soy fiber, oat glucans, etc.

Highly fermentable fibers include but are not limited to gums, pectins and certain oligosaccharides such as xylooligosaccharides. Gums can include gums produced by microorganisms including but not limited to gellan and xanthan gums, and gums produced by plants such as acacia (gum arabic).

The fiber composition should have an organic matter disappearance or fermentability of about 0% to about 80%, although individual fiber components or fibers used individually can have fermentability ranging from 0% to 100%. "Organic matter disappearance" is the percentage of the organic matter that is lost by fermentation when a fiber composition is incubated in vitro with fecal matter from an animal or human for 12-24 hours at or close to physiological body temperature, and is calculated as:

$$\{1-[(\text{organic matter residue}-\text{organic matter blank})/\text{initial organic matter}]\} \times 100.$$

Typically, the ginger or extract thereof and other, optional, odor reducing agent(s) of the composition ingested by the animal are present at concentrations that do not impart an aroma or flavor that causes the animal to perceive the composition to be unacceptable for consumption, or otherwise refuse, reject or be inhibited from ingesting the composition. However, even where such concentrations are exceeded, a desirable aroma and flavor can often be achieved using aroma or flavor enhancers, for example to mask the aroma or flavor of the ginger.

The ginger or extract thereof and other, optional, odor reducing agent(s) of the composition should be present at concentrations that are not deleterious to the animal's health. Thus, for example, ginger should be present at a concentration that does not cause undesirable effects on digestion, particularly long-term effects lasting several days or longer. Undesirable effects on digestion can include, for example, constipation or diarrhea.

In one embodiment, the composition is a food or nutritional supplement comprising ginger or an extract thereof, alone or in combination with one or more additional odor reducing agents. Supplements include, for example, a feed or pet food used with another feed or pet food to improve the nutritive balance or performance of the total. Contemplated supplements include compositions that are fed undiluted as a supplement to other feeds or pet foods, offered free choice with other parts of an animal's ration that are separately available, or diluted and mixed with an animal's regular feed or pet food to produce a complete feed or pet food. The AAFCO, for example, provides a discussion relating to supplements in the American Feed Control Officials, Inc. Official Publication (2003), at p. 220. Supplements can be in various forms including, for example, powders, liquids, syrups, pills, encapsulated compositions, etc.

In another embodiment, the composition is a treat comprising ginger or an extract thereof, alone or in combination with one or more additional odor reducing agents. Treats include, for example, compositions that are given to an animal to entice the animal to eat during a non-meal time. Contemplated treats for canines include, for example, dog biscuits in the shape of dog bones. Treats can be nutritional, wherein the composition comprises one or more nutrients, and can, for example, have a composition as described above for food. Non-nutritional treats encompass any other treats that are non-toxic. The ginger or extract thereof can be included in a composition coated onto the treat, or can be incorporated into the treat, or both.

In another embodiment, the composition is a toy comprising ginger or an extract thereof, alone or in combination with one or more additional odor reducing agents. Toys include, for example, chewable toys. Contemplated toys for dogs include, for example, artificial bones. The ginger, for example, can be present in a coating on the surface of the toy or on the surface of a component of the toy, or can be incorporated partially or fully throughout the toy, or both. In a contemplated embodiment, the ginger is orally accessible by the animal when playing with or chewing the toy.

Illustrative toys suitable for modification in accordance with the invention are disclosed in the patents individually cited below and incorporated herein by reference.

U.S. Pat. No. 5,339,771 and references disclosed therein.
U.S. Pat. No. 5,419,283 and references disclosed therein.

It should be recognized that this invention contemplates both partially consumable toys (e.g., toys comprising plastic components) and fully consumable toys (e.g., rawhides and various artificial bones). It should be further recognized that this invention contemplates toys for both human and non-human use, particularly for companion, farm, and zoo animal use, and particularly for dog or cat use.

The terms "treat" and "toy" can be considered interchangeable for the purposes of this specification. However, in general a treat is fully edible and a toy in accordance with the invention has an edible coating.

In another embodiment, the composition is an aqueous pet beverage comprising a zingiberaceous spice or extract thereof. The beverage comprises mainly water and optionally further comprises a flavor enhancing agent such as a liver digest.

In another embodiment, the composition is a high-moisture gel or "solid water" composition, for example substantially as disclosed in U.S. Pat. No. 6,528,084 but with addition of a zingiberaceous spice or extract thereof. Such a composition can have a jelly-like consistency similar to that of Jell-O® dessert.

In preparing a composition of the present invention, the components of the composition are adjusted so that the ginger or extract thereof, alone or in combination with one or more additional odor reducing agents, is present in the composition at a desired concentration, typically a concentration equivalent to ginger, for example powdered ginger, in an amount of at least about 0.01%, illustratively about 0.05% to about 12%, or about 0.1% to about 5%, of the total weight of the composition. When an oil or active constituent extracted from ginger is used, it should normally be present in the composition at about 1 ppm to about 2000 ppm. The ginger or an extract thereof can, for example, be incorporated into the composition during formulation processing, such as during and/or after mixing of other components of the composition. Distribution of these components into the composition can be accomplished by any conventional method including standard mixing procedures. Any other zingiberaceous spice or extract thereof can be used in a similar manner.

Compositions of the present invention (particularly foods) can be prepared in a canned or wet form using conventional pet food processes. Typical requirements for a nutritionally adequate food composition are:

carbohydrate, 0 to about 90%, illustratively about 5% to about 45%, by weight;

protein, about 5% to about 70%, illustratively about 10% to about 60%, by weight;

fat, about 2% to about 50%, illustratively about 5% to about 40%, by weight;

total dietary fiber, about 0.1% to about 20%, illustratively about 1% to about 11%, by weight; and nutritional balancing agents such as vitamins and minerals, 0 to about 15%, illustratively about 2% to about 8%, by weight.

To these ingredients are added one or more excreta odor reducing agents such as ginger or an extract thereof, in accordance with the invention.

Vitamins and minerals should be included in amounts required to avoid deficiency and maintain health. The National Research Council, for example, gives recommendations for farm animals in Nutrient Requirements of Swine, 10th Revised Edition (1998); Nutrient Requirements of Poultry, 9th Revised Edition (1994); Nutrient Requirements of Horses, 5th Revised Edition (1989), etc. as published by National Academy Press, Washington, D.C. AAFCO provides recommendations for dogs and cats in the American Feed Control Officials, Inc. Official Publication (2003), at pp. 126-240.

In one contemplated embodiment, ground animal (e.g., mammal, poultry, and/or fish) proteinaceous tissues are mixed with other ingredients, including for example animal fats and vegetable oils, cereal grains, other nutritionally balancing ingredients, special purpose additives (e.g., vitamin and mineral mixtures, inorganic salts, cellulose and beet pulp, bulking agents, and the like); and water sufficient for processing is also added. These ingredients typically are mixed in a vessel suitable for heating while blending the components. Heating of the mixture can be effected in any suitable manner, such as, for example, by direct steam injection or by using a vessel fitted with a heat exchanger. Following addition of the last ingredient, the mixture is heated to a temperature of about 10° C. to about 100° C. Temperatures outside this range are acceptable, but can be commercially impractical without use of other processing aids. When heated to the appropriate temperature, the material is typically in the form of a thick liquid. The thick liquid is filled into suitable containers such as cans, jars, pouches or the like. A lid is applied, and the container is hermetically sealed. The sealed containers are then placed into conventional equipment designed to sterilize the contents. This is usually accomplished by heating to a temperature of at least about 110° C. for an appropriate time, which is dependent on, for example, the temperature used and the composition. Products can also be prepared by an aseptic process wherein the contents are heated to commercial sterility before being packaged in sterilized containers.

Compositions of the present invention (particularly foods) can be prepared in a dry form using conventional processes. In one contemplated embodiment, dry ingredients, including, for example, animal protein sources, plant protein sources, grains, etc., are ground and mixed together. Moist or liquid ingredients, including fats, oils, animal protein sources, water, etc., are then added to and mixed with the dry mix. The mixture is then processed into kibbles or similar dry pieces. Kibble is often formed using an extrusion process in which the mixture of dry and wet ingredients is subjected to mechanical work at a high pressure and temperature, and forced through small openings and cut off into kibble by a rotating knife. The wet kibble is then dried and optionally coated with one or more topical coatings which can include, for example, flavors, fats, oils, powders, and the like. Kibble also can be made from the dough using a baking process, rather than extrusion, wherein the dough is placed into a mold before dry-heat processing. Kibble also can be made from a food matrix undergoing pelletization. It is important to note that the ginger or extract thereof, alone or in combination with additional odor reducing agents, can be incorporated into the food composition by adding the ginger, for example, to the above-described mixtures before extrusion, or by coating the extruded kibble or pellets with, for example, ginger as an ingredient of a topical coating.

Treats of the present invention can be prepared by, for example, an extrusion or baking process similar to those described above for dry food. Other processes also can be used to either apply a coating comprising ginger or an extract thereof, alone or in combination with one or more additional odor reducing agents, on the exterior of existing treat forms, or inject the ginger or an extract thereof into an existing treat form.

Animal toys of the present invention are typically prepared by coating any existing toy with a composition comprising ginger or an extract thereof, alone or in combination with one or more additional odor reducing agents.

Compositions of the present invention can contain additives typically known in the art, for example stabilizers and processing aids, in amounts which do not impair the purpose and effect provided by the invention. Stabilizers can be added to increase the shelf life of the composition by supplementing or reinforcing the effect of the physical methods used to increase the shelf life. Examples of stabilizers are preservatives, antioxidants, synergists and sequestrants, packaging gases, emulsifiers, thickeners, gelling agents and humectants. Examples of emulsifiers and thickening agents are gelatin, cellulose ethers, starch, starch esters, starch ethers and modified starches.

Other additives known in the art are used for nutritional and palatability purposes. Suitable amounts are easily determined by a person having ordinary skill in the art, however an illustrative amount of up to about 5% by weight of such additives is customarily used. Examples include iron oxide, sodium chloride, potassium citrate, potassium chloride and other edible salts, flavorings, vitamins, minerals and coloring.

EXAMPLES

The following examples are merely illustrative, and do not limit this disclosure in any way.

Example 1

An experiment was conducted to characterize the effects of ginger on stool odor compounds and on the gas odor and frequency of flatulent episodes in dogs. The experiment was conducted using a canine adult food with or without addition of 0.5% by weight ginger root powder. Six dogs were fed control food without ginger for 2 weeks followed by food containing 0.5% ginger root powder for another 2 weeks. Stool odor compounds were measured and gas measurements were taken in those dogs at the end of each 2-week feeding period. Stool odor compounds were extracted by putting a standard amount of stool in a glass container and incubating a solid phase microextraction fiber in the headspace. Volatiles bound to the fiber were desorbed and injected into a gas chromatography unit for separation into the various peaks. The peaks were then analyzed by mass spectrometry.

Table 1 presents results obtained from three dogs. The data show that ginger reduced three classes of stool odor compounds: phenols, heterocycles and indoles. The numbers indicate relative differences as measured by the area under the peak in a chromatogram.

TABLE 1

| Effect of ginger on stool odor compounds | | |
|---|---|---|
| Stool Volatiles | Control | Control + Ginger |
| Carboxylic Acids | $7.57 \times 10^6$ | $1.26 \times 10^7$ |
| Esters | $1.94 \times 10^6$ | $1.69 \times 10^6$ |
| Heterocycles | $8.85 \times 10^4$ | $5.38 \times 10^4$ |
| Phenols | $1.28 \times 10^5$ | $3.06 \times 10^4$ |
| Thiols, Sulfides | $3.89 \times 10^4$ | $3.36 \times 10^4$ |
| Ketones | $2.10 \times 10^6$ | $1.35 \times 10^6$ |
| Aldehydes | $4.32 \times 10^4$ | $6.34 \times 10^4$ |
| Alcohols | $2.46 \times 10^5$ | $2.16 \times 10^5$ |
| Indoles | $9.20 \times 10^3$ | $2.97 \times 10^3$ |

Table 2 presents flatulence data obtained from five dogs. Flatulence data were obtained using a gas monitoring system consisting of a gas measuring unit and a canine jacket made from spandex and nylon material, with two pockets to carry the unit in one pocket and a balancing weight in the other. The gas measuring unit has an internal pump. Tubing is connected to the pump in a circular loop that goes around the animal close to the rectum. As air is pumped through the gas unit, an internal sensor in the pump measures hydrogen sulfide that is emitted from the animal. Hydrogen sulfide ($H_2S$) measurements indicate that ginger reduced this gas odor compound and the frequency of flatulent episodes. Ginger also reduced the number of flatulent events.

TABLE 2

Effect of ginger on measurements of flatulence

|  | Control | Control + Ginger |
|---|---|---|
| $H_2S$ ppm per episode | 15 | 9 |
| Episodes per hour | 2 | 1 |
| Total number of episodes | 13 | 6 |
| Total sum of $H_2S$ | 208 | 81 |
| Highest $H_2S$ level detected | 19 | 11 |

Example 2

In another experiment, stool from dogs on a long term feeding study was analyzed to measure stool odor compounds. The dogs' diet was formulated with 2.4% prebiotic fibers consisting of beet pulp, oligosaccharides and rice bran. Stool and gas samples were collected as described in Example 1. Results are presented in Table 3. When Table 3 is compared with Table 1, it is apparent that fiber caused a shift from the more offensive carboxylic acid compounds to the less offensive ketone compounds. In the corresponding ginger study (see Table 1), ginger alone reduced esters and ketones, but did not cause a shift away from production of carboxylic acids. These results indicate that ginger in combination with fiber can have an additive, complementary or synergistic effect in reducing excreta odor.

TABLE 3

Effect of fiber on stool odor compounds

| Stool Volatiles | Control + Fiber |
|---|---|
| Carboxylic Acids | $1.25 \times 10^6$ |
| Esters | $1.38 \times 10^6$ |
| Heterocycles | $2.31 \times 10^5$ |
| Phenols | $4.77 \times 10^5$ |
| Thiols, Sulfides | $1.28 \times 10^5$ |
| Ketones | $7.05 \times 10^6$ |
| Aldehydes | $5.46 \times 10^4$ |
| Alcohols | $3.14 \times 10^5$ |
| Indoles | $1.48 \times 10^5$ |

Example 3

An experiment was conducted with twenty dogs fed diets including ginger, fiber or both. The dogs were fed one of four different foods for two weeks: control, control plus 0.5% ginger root powder, control plus a fiber blend and control plus 0.5% ginger root powder and fiber blend powder. The 2.4% fiber blend was citrus pulp, barley, arabinogalactan and banana flakes. At the end of each two week period on each diet, stool was collected and analyzed to measure stool odor compounds. The stool odor compounds were extracted by putting a standard amount of stool in a glass container and incubating a solid phase microextraction fiber in the headspace. Volatiles bound to the fiber were desorbed and injected into a gas chromatography unit for separation into the various peaks. The peaks were then analyzed by mass spectrometry.

The results are shown in Table 4 below. The addition of ginger to the food resulted in decreased stool levels of carboxylic acids and heterocycles (including indole) while addition of fiber caused a decrease in carboxylic acids. The addition of both ginger and fiber resulted in a bigger reduction in carboxylic acids and phenols. The numbers indicate relative differences as measured by the area under the peak in a chromatogram.

TABLE 4

Effect of ginger and fiber on stool odor compounds

|  | Carboxylic Acids | Phenols | Thiols, Sulfides | Heterocycles |
|---|---|---|---|---|
| Control | 702,906 | 14,129 | 11,095 | 14,469 |
| Control + Ginger | 521,863 | 15,682 | 13,636 | 10,182 |
| Control + Fiber | 608,581 | 65,212 | 42,183 | 16,914 |
| Control + Ginger + Fiber | 486,182 | 9,774 | 12,354 | 14,517 |

Example 4

An experiment was conducted with twenty dogs fed diets including ginger or fiber or both. The purpose of this study was to follow up on the experiment of Example 2 to further characterize the interaction of ginger and fiber.

The dogs were fed four foods in a 4×4 Latin square design. The dogs were divided into four groups of five dogs each; each group was fed one of four different foods for two weeks. At the end of each two week period, each group of dogs was rotated to a different food. Stool and gas samples were collected as described in Example 1, and collections were performed at the end of each dietary intervention period. The dogs were fed one of the following four foods for two weeks: control, control plus 0.75% ginger, control plus 1% added fiber, and control plus 0.75% ginger and 1% added fiber. The fiber combination was 0.4% arabinogalactan, 0.4% banana flakes and 0.2% oligosaccharides.

Results are shown in Tables 5 and 6 below. The numbers in Table 5 represent relative differences as measured by the area under a peak in a chromatogram. Table 5 shows that (i) ginger reduced indoles, fatty acids and ketones; (ii) fiber reduced indoles, heterocycles, fatty acids and ketones; and (iii) ginger and fiber in combination reduced thiols and sulfides. This study confirmed a hypothesis derived from Examples 1 and 2 that a combination of ginger and fiber could increase the ketone to carboxylic acid ratio. Table 6 shows the effect of ginger and/or fiber on flatulence. Ginger and fiber alone demonstrated effectiveness in reducing the number of flatulent episodes, the sum of hydrogen sulfide, and the highest level of hydrogen sulfide. Ginger and fiber in combination decreased the highest level of hydrogen sulfide detected.

An analysis of the food composition for Example 4 showed that most of the major components of the food were similar except for the fiber content (Table 7).

TABLE 5

Effect of ginger and fiber on stool odor compounds

|  | Indoles | Thiols, Sulfides | Phenols | Heterocycles | Fatty Acids[1] | Ketones |
|---|---|---|---|---|---|---|
| Control | 7,335 | 24,029 | 20,994 | 11,975 | 35,981 | 83,036 |
| Control + Fiber | 3,220 | 25,680 | 32,927 | 2,012 | 31,463 | 76,818 |

TABLE 5-continued

Effect of ginger and fiber on stool odor compounds

|  | Indoles | Thiols, Sulfides | Phenols | Heterocycles | Fatty Acids[1] | Ketones |
|---|---|---|---|---|---|---|
| Control + Ginger | 6,746 | 29,475 | 42,487 | 12,008 | 30,698 | 11,888 |
| Control + Fiber + Ginger | 11,634 | 20,151 | 39,668 | 11,225 | 34,008 | 99,810 |

[1]Short and branched chain

TABLE 6

Effect of ginger and fiber on flatulence in dogs

|  | No. of episodes | Sum of $H_2S$ (ppm) | Highest level of $H_2S$ (ppm) |
|---|---|---|---|
| Control | 3.2 | 37 | 8.6 |
| Control + Fiber | 3.0 | 22.1 | 1.5 |
| Control + Ginger | 2.6 | 22.7 | 6.9 |
| Control + Fiber + Ginger | 3.9 | 46.2 | 4.7 |

TABLE 7

Percent composition of food in Example 4

| % DMB | Control | Control + Fiber | Control + Ginger | Control + Fiber + Ginger |
|---|---|---|---|---|
| Carbohydrate | 49 | 49 | 49 | 49.5 |
| Protein | 24 | 24 | 23.5 | 23.5 |
| Fat | 13.8 | 13.8 | 13.7 | 13.8 |
| Crude Fiber | 1.9 | 2.1 | 1.8 | 1.8 |
| Insoluble Fiber | 6.5 | 7.2 | 6.5 | 6.5 |
| Soluble Fiber | 1.0 | 0.6 | 1.0 | 1.1 |

Example 5

An experiment was conducted with twenty cats fed diets including ginger. The purpose of this study was to determine the effect of ginger consumption on stool odor compounds in cat stools. The cats were fed a control diet for two weeks, and then the following two weeks the cats were fed control diet with 0.5% ginger. Stools were collected at the end of each dietary intervention period and analyzed as described in Example 1. The results are shown in Table 8 below. The numbers shown represent relative differences as measured by the area under a peak in a chromatogram. Addition of ginger to the food reduced the levels of indoles and heterocycles by 48% and 53% respectively.

TABLE 8

Effect of ginger on stool odor compounds

|  | Control | Control + Ginger | % Change |
|---|---|---|---|
| Heterocycles | 19,736 | 10,377 | 53 |
| Phenols | 90,464 | 108,481 | 120 |
| Thio and Sulfides | 17,761 | 21,826 | 123 |
| Ketones | 455,540 | 434,565 | 95 |
| Aldehydes | 4,242 | 4,895 | 115 |
| Alcohols | 121,354 | 153,653 | 127 |
| Indoles | 18,950 | 9,158 | 48 |

Example 6

An experiment was conducted with twenty normal, healthy cats fed diets including ginger. The purpose of this study was to determine the effect of ginger consumption on odor of cat stools as perceived by human panelists. The cats were fed either a control diet or a control diet plus 0.5% ginger for two weeks. Stool samples were collected at the end of each dietary intervention study.

Nine human panelists were used to detect differences in intensity of the stool odor by sniffing the odor through a port with a constant airflow and comparing it to a standard curve using n-butanol. The panelists were blinded to the sample and compared the odor intensity of the stool samples to that of n-butanol, a standard compound used to calibrate intensity of odor. Although differences in the stool odor components were not detectable by mass spectroscopy in this study, the panelists were able to detect a difference in the intensity of the stool odor. The panelists found that stool samples from the period of time the cats were on the food with added ginger was less intense than the stool samples from the period when the cats were on the control food with no ginger (average intensity 1022 versus 1123 ppm n-butanol, respectively).

All patents and publications cited herein are incorporated by reference into this application in their entirety.

The words "comprise", "comprises", and "comprising" are to be interpreted inclusively rather than exclusively.

What is claimed is:

1. A method for reducing odor of stool of a companion animal, the method comprising causing the animal to ingest a pet food composition comprising
   (i) a stool odor-reducing effective amount of ginger or an extract thereof;
   (ii) at least one fiber;
   (iii) a zinc salt:
   (iv) about 5% to about 45% by weight carbohydrate;
   (v) about 10% to about 60% by weight protein;
   (vi) about 5% to about 40% by weight fat; and
   (vii) about 0.1% to about 20% total dietary fiber, wherein said amount of ginger or extract thereof is about 0.005% to about 12% by weight and wherein said amount of at least one fiber is about 5% to about 20% by weight.

2. The method of claim 1, wherein the animal is a cat.

3. The method of claim 1, wherein the animal is a dog.

4. The method of claim 1, wherein the composition further comprises one or more additional, herbs, spices, extracts of herbs, extracts of spices, minerals probiotics, enzymes and proteins.

5. The method of claim 1, wherein the composition comprises one or more of rosemary, garlic, caraway, dove wheat, chickweed, banana, marjoram, chamomile, nutmeg, allspice, cumin, tarragon, thyme, licorice, basil, celery seed, lemon balm, lavender, fennel, anise, nettle, echinacea and yucca.

6. The method of claim 1, wherein the composition further comprises an essential oil selected from the group consisting of oils of lemon, peppermint, thyme, vanilla, citrus, cinnamon, eucalyptus, lavender, clove and oregano.

7. The method of claim 1, wherein the at least one fiber is selected from the group consisting of cellulose, hemicellulose, citrus pulp, barley, bran, banana, oat fiber, oat glucan, mannan-oligosaccharide, pectin, xvlooligosaccharide, burdock, beet pulp, inulin, arabinogalactan and oligosaccharide.

8. The method of claim 1, wherein of the total fiber present in the compositions at least about 20% by weight is nonfermentable.

* * * * *